United States Patent
Chang et al.

(10) Patent No.: US 9,806,514 B2
(45) Date of Patent: Oct. 31, 2017

(54) CONNECTOR LEAKAGE PROTECTION SYSTEM AND CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Gui Chang, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 386 days.

(21) Appl. No.: 14/691,006

(22) Filed: Apr. 20, 2015

(65) Prior Publication Data
US 2016/0285253 A1 Sep. 29, 2016

(30) Foreign Application Priority Data
Mar. 25, 2015 (CN) .......................... 2015 1 0132634

(51) Int. Cl.
*H02H 3/00* (2006.01)
*H02H 3/18* (2006.01)

(52) U.S. Cl.
CPC ...................... *H02H 3/18* (2013.01)

(58) Field of Classification Search
CPC .......................................................... H02H 3/18
USPC .......................................................... 361/100
See application file for complete search history.

(56) References Cited

U.S. PATENT DOCUMENTS

| 5,319,515 | A * | 6/1994 | Pryor | H02H 3/087 361/100 |
| 9,448,616 | B2 * | 9/2016 | Min | G06F 1/3206 |
| 9,520,773 | B2 * | 12/2016 | Chang | H02M 3/04 |

* cited by examiner

*Primary Examiner* — Stephen W Jackson
(74) *Attorney, Agent, or Firm* — Steven Reiss

(57) ABSTRACT

A connector leakage protection system includes a current foldback module with a first end coupled to an output port of a DC power supply; an anti-interference module with a first end coupled to a second end of the current foldback module, and a second end coupled to a power port of a connector; and a leakage protection module between the output port and the first end of the current foldback module, or the second end of the current foldback module and the first end of the anti-interference module, or the second end of the anti-interference module and the power port. When the output port outputs a DC voltage, the leakage protection module is switched on. When the output port does not output the DC voltage, the leakage protection module is switched off, preventing current leakage from flowing to the output port. A connector leakage protection circuit is also provided.

16 Claims, 3 Drawing Sheets

CONNECTOR LEAKAGE PROTECTION SYSTEM AND CIRCUIT

FIELD

The subject matter herein generally relates to connectors.

BACKGROUND

A connector secured to a mother board of a host is generally coupled to another connector secured to an electronic device. For example, a display port in the mother board is coupled to a matched port in a monitor by a cable bus. When the host is in the sleep state (S3), dormant state (S4), or the shutdown state (S5), leakage current from the monitor easily flows to the motherboard via the display port.

BRIEF DESCRIPTION OF THE DRAWINGS

Implementations of the present technology will now be described, by way of example only, with reference to the attached figures.

DETAILED DESCRIPTION

Figure 1:
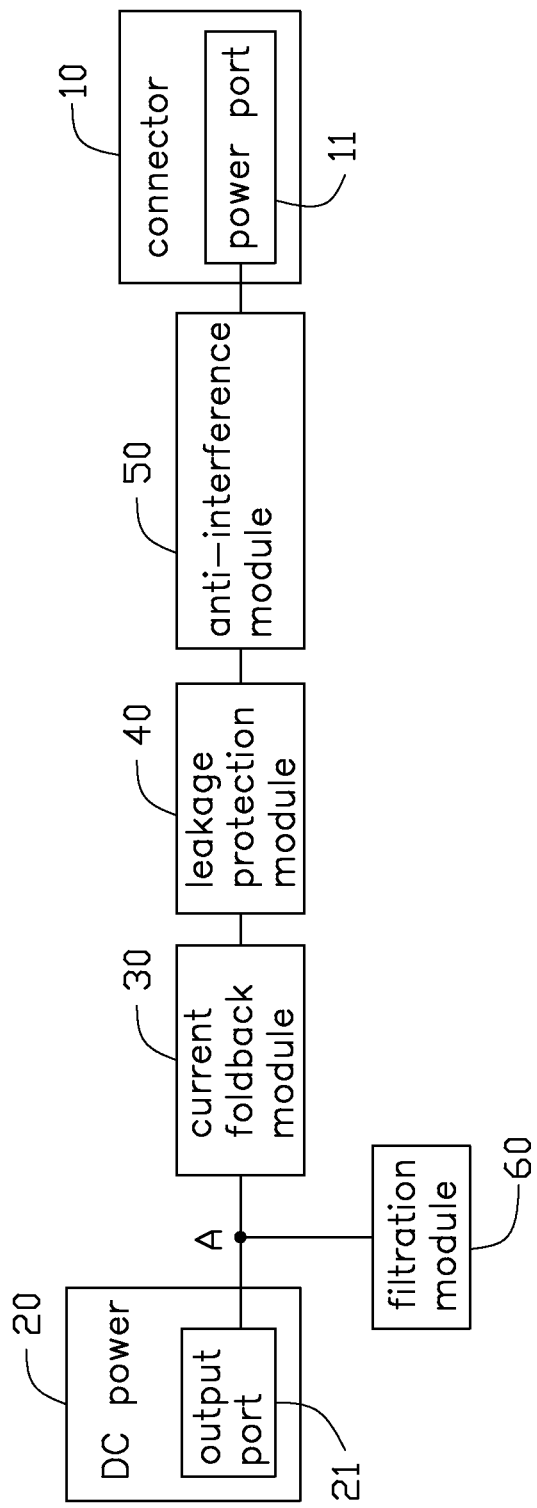
FIG. 1 is a block diagram of an embodiment of a connector leakage protection system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a connector leakage protection system in accordance with an embodiment. The connector leakage protection system is configured to prevent current leakage from a connector 10 from flowing to a DC power 20. The connector leakage protection system can include a current foldback module 30, a leakage protection module 40, and an anti-interference module 50. In at least one embodiment, the connector 10 is a display port.

A first end of the current foldback module 30 is coupled to an output port 21 of the DC power 20. A second end of the current foldback module 30 is coupled to a forward end of the leakage protection module 40. The output port 21 is configured to output a DC voltage, such as +3V, in a first state, and stop outputting the DC voltage in a second state. In at least one embodiment, the first state is S1 or S2, and the second state is S3, S4, or S5.

The leakage protection module 40 is switched on when the output port 21 outputs the DC voltage and switched off when the output port 21 does not output the DC voltage. A reverse end of the leakage protection module 40 is coupled to the anti-interference module 50.

The anti-interference module 50 is coupled to a power port 11 of the connector 10 and configured to prevent high frequency signals.

The leakage protection module 40 can also be coupled between the anti-interference module 50 and the power port 11, and coupled between the output port 21 and the first end of the current foldback module 30.

When the output port 21 does not output the DC voltage, the leakage protection module 40 is cut down, preventing current leakage from the power port 11 from flowing to the output port 21.

The connector leakage system further comprises a filtration module 60. A first end of the filtration module 60 is coupled to the second end of the current foldback module 30. A second end of the filtration module 60 is grounded. A connection node A is defined between the filtration module 60 and the current foldback module 30. The leakage protection module 40 can be coupled between the current foldback module 30 and the connection node A or coupled between the connection node A and the filtration module 60.

Figure 2:
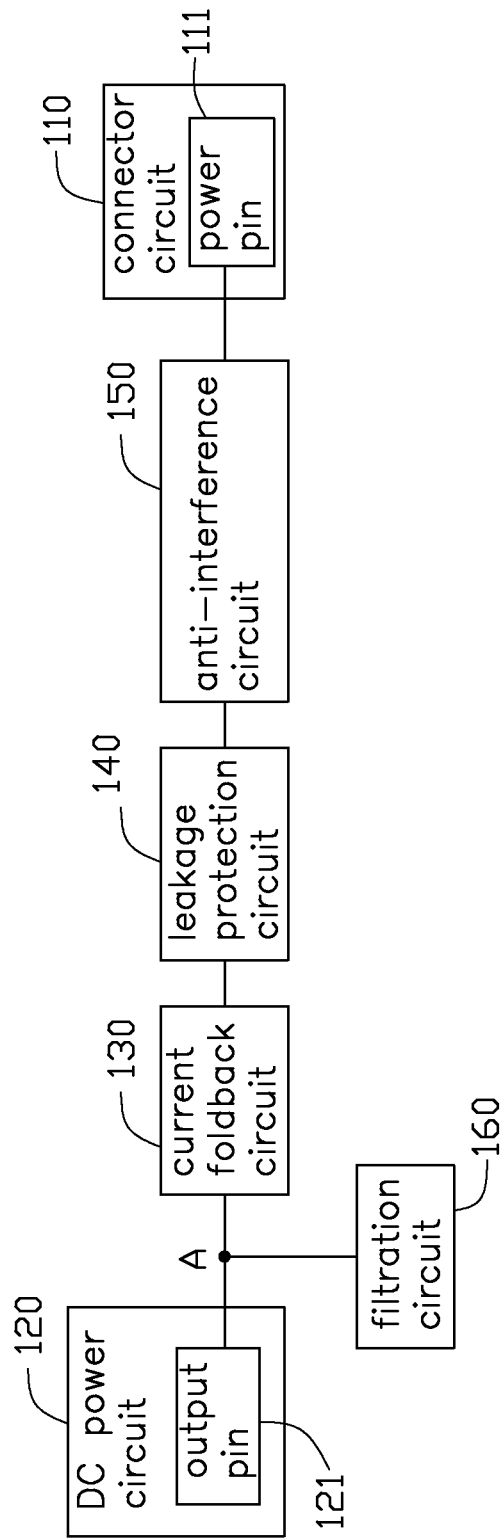
FIG. 2 is a block diagram of an embodiment of a connector leakage protection circuit.

FIG. 2 illustrates a connector leakage protection circuit in accordance with an embodiment. The connector leakage protection circuit is configured to prevent current leakage from a connector circuit 110 from flowing to a DC power circuit 120. The connector leakage protection circuit can include a current foldback circuit 130, a leakage protection circuit 140, and an anti-interference circuit 150. In at least one embodiment, the connector circuit 110 is a display port circuit.

Figure 3:
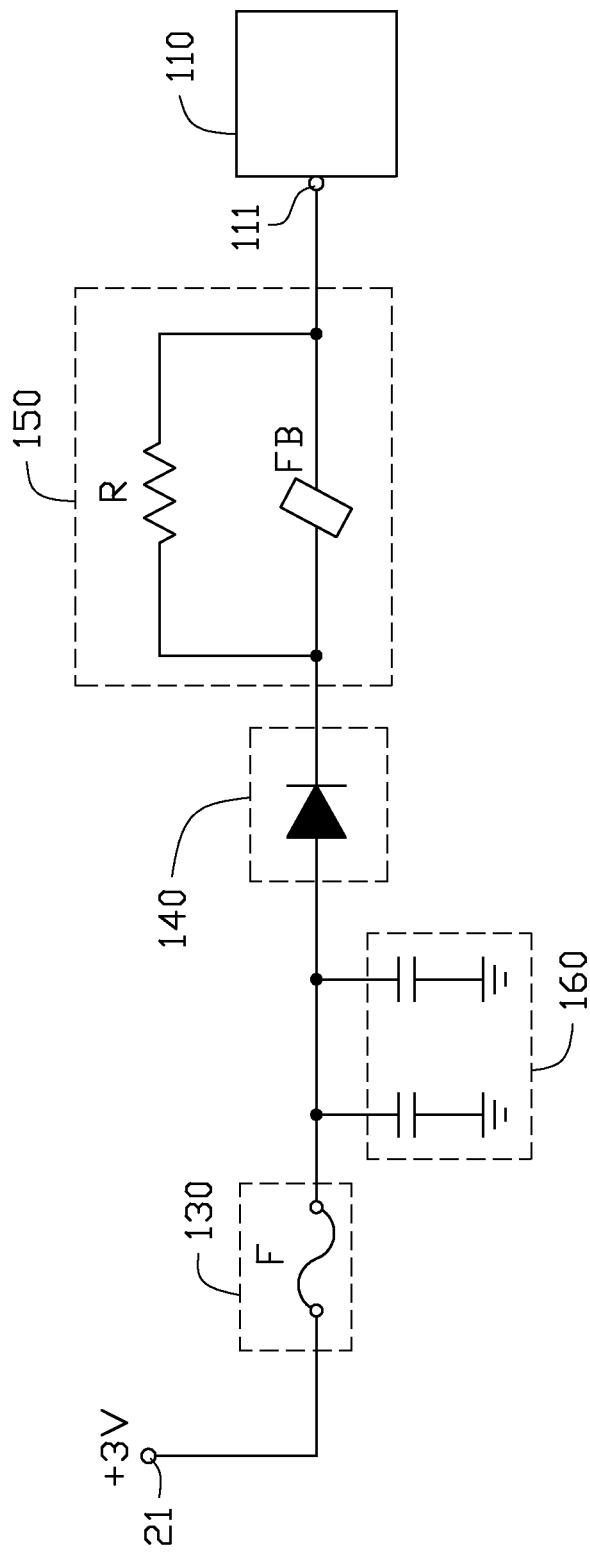
FIG. 3 is a circuit diagram of the connector leakage protection circuit of FIG. 2 but without a DC power circuit and a connector circuit.

FIG. 3 illustrates that the current foldback circuit 130 is a fuse F. A first end of the fuse F is coupled to an output pin 121 of the DC power circuit 120. The output pin 121 is configured to output a DC voltage, such as +3V, in a first state, and stop outputting the DC voltage in a second state. In at least one embodiment, the first state is normal state (S0) or power on state (S1), and the second state is S3, S4, or S5.

The leakage protection circuit 140 is a diode. A second end of the fuse F is coupled to a forward end of the leakage protection circuit 140. The diode is switched on when the output pin 121 outputs the DC voltage and switched off when the output pin 121 does not output the DC voltage. A reverse end of the leakage protection circuit 140 is coupled to the anti-interference circuit 150.

The anti-interference circuit 150 can include a magnetic bead FB and a zero ohm resistor R. A first end of the magnetic bead FB is coupled to a negative pole of the diode. A second end of the magnetic bead FB is coupled to a power pin 111 of the connector circuit 110. The zero ohm resistor R is coupled to the first end and the second end of the magnetic bead FB in parallel.

The leakage protection circuit 140 can also be coupled between the anti-interference circuit 150 and the power pin 111, and coupled between the output pin 121 and the first end of the fuse F.

When the output pin 121 does not output the DC voltage, the diode is cut down, preventing current leakage from the power pin 111 from flowing to the output pin 121.

The connector leakage circuit further comprises a filtration circuit 160. A first end of the filtration circuit 160 is coupled to the second end of the current foldback circuit 130. A second end of the filtration circuit 160 is grounded. The connection node A is defined between the filtration circuit 160 and the current foldback circuit 130. The leakage protection circuit 140 can be coupled between the current foldback circuit 130 and the connection node A or coupled between the connection node A and the filtration circuit 160. The filtration circuit 160 can include a plurality of grounded capacitors, such C1 and C2.

The embodiments shown and described above are only examples. Many details are often found in the art such as the other features of a connector leakage protection system and circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A connector leakage protection system comprising:
a direct current (DC) power supply having an output port;
a current foldback module having a first end configured to be coupled to the output port;
an anti-interference module having a first end coupled to a second end, opposite the first end, of the current foldback module, and a second end configured to be coupled to a power port of a connector; and
a leakage protection module configured to be coupled between the output port and the first end of the current foldback module, the second end of the current foldback module and the first end of the anti-interference module, or the second end of the anti-interference module and the power port;
wherein when the output port outputs a DC voltage, the leakage protection module is switched on; and when the output port does not output the DC voltage, the leakage protection module is switched off, thereby preventing current leakage from the power port flowing to the output port.

2. The connector leakage protection system of claim 1, further comprising a filtration module, wherein a first end of the filtration module is coupled to the second end of the current foldback module, and a second end of the filtration module is grounded.

3. The connector leakage protection system of claim 2, wherein a connection node is defined between the filtration module and the current foldback module; the leakage protection module is coupled between the current foldback module and the connection node or coupled between the connection node and the first end of anti-interference module.

4. A connector leakage protection circuit comprising:
a direct current (DC) power supply circuit having an output pin;
a current foldback circuit having a first end configured to be coupled to the output pin;
an anti-interference circuit having a first end coupled to a second end of the current foldback circuit, and a second end configured to be coupled to a power pin of a connector circuit; and
a leakage protection circuit coupled between the output pin and the first end of the current foldback circuit, the second end of the current foldback circuit and the first end of the anti-interference circuit, or the second end of the anti-interference circuit and the power pin;
wherein when the output pin outputs a DC voltage, the leakage protection circuit is switched on; and when the output pin does not output the DC voltage, the leakage protection circuit is switched off, thereby preventing current leakage from the power pin flowing to the output pin.

5. The connector leakage protection circuit of claim 4, wherein the current foldback circuit is a fuse, a first end of the fuse is coupled to an output pin, and a second end of the fuse is coupled to a forward end of the leakage protection circuit.

6. The connector leakage protection circuit of claim 5, wherein the leakage protection circuit is a diode, the positive pole of the diode is coupled to the second end of the fuse; and the negative pole of the diode is coupled to the first end of the anti-interference circuit.

7. The connector leakage protection circuit of claim 6, wherein the anti-interference circuit comprises a magnetic bead, a first end of the magnetic bead is coupled to the negative pole of the diode, and a second end of the magnetic bead is coupled to the power pin.

8. The connector leakage protection circuit of claim 7, wherein the anti-interference circuit further comprises a zero ohm resistor, and the zero ohm resistor is coupled to the first end and the second end of the magnetic bead in parallel.

9. The connector leakage protection circuit of claim 4, further comprising a filtration circuit, wherein a first end of the filtration circuit is coupled to the second end of the current foldback circuit, and a second end of the filtration circuit is grounded.

10. The connector leakage protection circuit of claim 9, wherein a connection node is defined between the filtration circuit and the current foldback circuit; the leakage protection circuit is coupled between the current foldback circuit and the connection node or coupled between the connection node and the first end of the anti-interference circuit.

11. A connector leakage protection circuit comprising:
a direct current (DC) power supply circuit having an output pin;
a current foldback circuit having a first end configured to be coupled to the output pin;
an anti-interference circuit having a first end coupled to a second end of the current foldback circuit, and a second end configured to be coupled to a power pin of a connector circuit;
a filtration circuit having a first end coupled to the second end of the current foldback circuit, and a second end grounded; and
a leakage protection circuit coupled between the output pin and the first end of the current foldback circuit, the second end of the current foldback circuit and the first end of the anti-interference circuit, or the second end of the anti-interference circuit and the power pin;

wherein when the output pin outputs a DC voltage, the leakage protection circuit is switched on; and when the output pin does not output the DC voltage, the leakage protection circuit is switched off, preventing current leakage from the power pin flowing to the output pin.

12. The connector leakage protection circuit of claim 11, wherein the current foldback circuit is a fuse, a first end of the fuse is coupled to an output pin, and a second end of the fuse is coupled to a forward end of the leakage protection circuit.

13. The connector leakage protection circuit of claim 12, wherein the leakage protection circuit is a diode, the positive pole of the diode is coupled to the second end of the fuse; and the negative pole of the diode is coupled to the first end of the anti-interference circuit.

14. The connector leakage protection circuit of claim 13, wherein the anti-interference circuit comprises a magnetic bead, a first end of the magnetic bead is coupled to the negative pole of the diode, and a second end of the magnetic bead is coupled to the power pin.

15. The connector leakage protection circuit of claim 14, wherein the anti-interference circuit further comprises a zero ohm resistor, and the zero ohm resistor is coupled to the first end and the second end of the magnetic bead in parallel.

16. The connector leakage protection circuit of claim 11, wherein a connection node is defined between the filtration circuit and the current foldback circuit; the leakage protection circuit is coupled between the current foldback circuit and the connection node or coupled between the connection node and the first end of the anti-interference circuit.

\* \* \* \* \*